United States Patent
Zhang et al.

(10) Patent No.: US 11,875,244 B2
(45) Date of Patent: Jan. 16, 2024

(54) ENHANCED DYNAMIC RANDOM ACCESS MEMORY (EDRAM)-BASED COMPUTING-IN-MEMORY (CIM) CONVOLUTIONAL NEURAL NETWORK (CNN) ACCELERATOR

(71) Applicant: SHANGHAITECH UNIVERSITY, Shanghai (CN)

(72) Inventors: Hongtu Zhang, Shanghai (CN); Yuhao Shu, Shanghai (CN); Yajun Ha, Shanghai (CN)

(73) Assignee: SHANGHAITECH UNIVERSITY, Shanghai (CN)

( * ) Notice: Subject to any disclaimer, the term of this patent is extended or adjusted under 35 U.S.C. 154(b) by 0 days.

(21) Appl. No.: 18/009,341

(22) PCT Filed: Aug. 5, 2022

(86) PCT No.: PCT/CN2022/110410
§ 371 (c)(1),
(2) Date: Dec. 9, 2022

(87) PCT Pub. No.: WO2023/056779
PCT Pub. Date: Apr. 13, 2023

(65) Prior Publication Data
US 2023/0196079 A1    Jun. 22, 2023

(30) Foreign Application Priority Data

Oct. 8, 2021    (CN) .......................... 202111169936.3

(51) Int. Cl.
*G06N 3/0464*    (2023.01)
*G06F 5/16*    (2006.01)

(52) U.S. Cl.
CPC ............. *G06N 3/0464* (2023.01); *G06F 5/16* (2013.01)

(58) Field of Classification Search
None
See application file for complete search history.

(56) References Cited

U.S. PATENT DOCUMENTS

2020/0117986 A1    4/2020    Burr et al.
2020/0310758 A1    10/2020    Desoli et al.

FOREIGN PATENT DOCUMENTS

| CN | 113946310 A | 1/2022 |
| CN | 114281301 A | 4/2022 |

OTHER PUBLICATIONS

Y. Lecun, et al., Backpropagation Applied to Handwritten Zip Code Recognition, Neural Computation, 1989, pp. 541-551, vol. 1.

(Continued)

*Primary Examiner* — Alan Chen
(74) *Attorney, Agent, or Firm* — Bayramoglu Law Offices LLC

(57) ABSTRACT

An enhanced dynamic random access memory (eDRAM)-based computing-in-memory (CIM) convolutional neural network (CNN) accelerator comprises four P2ARAM blocks, where each of the P2ARAM blocks includes a 5T1C ping-pong eDRAM bit cell array composed of 64×16 5T1C ping-pong eDRAM bit cells. In each of the P2ARAM blocks, 64×2 digital time converters convert a 4-bit activation value into different pulse widths from a row direction and input the pulse widths into the 5T1C ping-pong eDRAM bit cell array for calculation. A total of 16×2 convolution results are output in a column direction of the 5T1C ping-pong eDRAM bit cell array. The CNN accelerator uses the 5T1C ping-pong eDRAM bit cells to perform multi-bit storage and convolution in parallel. An S2M-ADC scheme is proposed to allot an area of an input sampling capacitor of an ABL to sign-numerical SAR ADC units of a C-DAC array without adding area overhead.

5 Claims, 16 Drawing Sheets

(56) References Cited

OTHER PUBLICATIONS

Y. Le Cun, et al., Handwritten Digit Recognition with a Back-Propagation Network, 1990, pp. 396-404.

Yann Lecun, et al., Gradient-Based Learning Applied to Document Recognition, Proceedings of the IEEE, 1998, pp. 2278-2324, vol. 86, No. 11.

Alex Krizhevsky, et al., ImageNet Classification with Deep Convolutional Neural Networks, Communications of the ACM, 2017, pp. 84-90, vol. 60, No. 6.

Peiyu Yang, et al., A Part-Aware Multi-Scale Fully Convolutional Network for Pedestrian Detection, IEEE Transactions on Intelligent Transportation Systems, 2020, pp. 1-13.

Yangjian Huang, et al., A Parallel Architecture of Age Adversarial Convolutional Neural Network for Cross-Age Face Recognition, IEEE Transactions on Circuits and Systems for Video Technology, 2020, pp. 1-28.

Lingfei Ma, et al., Multi-Scale Point-Wise Convolutional Neural Networks for 3D Object Segmentation From LiDAR Point Clouds in Large-Scale Environments, IEEE Transactions on Intelligent Transportation Systems, 2019, pp. 1-16.

Jiaojiao Fang, et al., Visual Object Tracking Based on Mutual Learning between Cohort Multiscale Feature-Fusion Networks with Weighted Loss, IEEE Transactions on Circuits and Systems for Video Technology, 2020, pp. 1-11.

Jinshan Yue, et al., 14.3 A 65nm Computing-in-Memory-Based CNN Processor with 2.9-to-35.8TOPS/W System Energy Efficiency Using Dynamic-Sparsity Performance-Scaling Architecture and Energy-Efficient Inter/Intra-Macro Data Reuse, IEEE International Solid-State Circuits Conference, 2020, pp. 234-235.

Qing Dong, et al., A 351TOPS/W and 372.4GOPS Compute-in-Memory SRAM Macro in 7nm FinFET CMOS for Machine-Learning Applications, IEEE International Solid-State Circuits Conference, 2020, pp. 242-243.

Yu-Der Chih, et al., 16.4 an 89TOPS/W and 16.3TOPS/mm2 All-Digital SRAM-Based Full-Precision Compute-In Memory Macro in 22nm for Machine-Learning Edge Applications, IEEE International Solid-State Circuits Conference, 2021, pp. 252-253.

Zhengyu Chen, et al., 15.3 A 65nm 3T Dynamic Analog RAM-Based Computing-in-Memory Macro and CNN Accelerator with Retention Enhancement, Adaptive Analog Sparsity and 44TOPS/W System Energy Efficiency, IEEE International Solid-State Circuits Conference, 2021, pp. 240-241.

Shanshan Xie, et al., 16.2 eDRAM-CIM: Compute-In-Memory Design with Reconfigurable Embedded-Dynamic- Memory Array Realizing Adaptive Data Converters and Charge-Domain Computing, IEEE International Solid-State Circuits Conference, 2021, pp. 248-249.

Non-2's complement mode:

2's complement mode:

|  | ISSCC'20 [9] | ISSCC'20 [10] | ISSCC'21 [11] | ISSCC'21 [12] | ISSCC'21 [13] | The present disclosure |
|---|---|---|---|---|---|---|
| Process | 65nm | 7nm | 22nm | 65nm | 65nm | 55nm |
| Multiply-add operation | Analog | Analog | Digital | Analog | Analog | Analog |
| Bit structure | 8T | 8T | 6T | 3T1C | 1T1C | 5T1C |
| Size of a macro module | 4Kb | 4Kb | 64Kb | 8Kb | 16Kb | 4Kb |
| Input accuracy | 2/4/6/8 | 4 | 1/8 | 4/8 | 8 | 4/8 |
| Weight accuracy | 4/8 | 4 | 4/8/12/16 | 4/8 | 8 | 3/4/5/6 |
| Weight form | 2's/Non-2's | Non-2's | 2's/Non-2's | Non-2's | 2's | 2's/Non-2's |
| ADC/SA accuracy | 5 | 4 | N/A | 5 | 8 | 5/6 |
| Supply voltage (V) | 0.9-1.05 | 1 | 0.72 | 0.85-1.1 | 1-1.2 | 0.8-1.2 |
| [1,2]Energy efficiency (TOPS/W) | 158.7 | 5.1 | 10.2 | 216.8 | 4.76 | [3]305.4 |
| [1,2]Calculation density (TOPS/mm²) | 2 | 0.2 | 0.6 | N/A | 0.008 | [3]59.1 |

[1]Peak value
[2]Assume that one multiply-add operation is two operations and the process is scaled to 65 nm. Assume that energy $\propto$ (process)², an area $\propto$ (process)², and performance $\propto$ process
[3]$L_{min}$ of 55 nm is 60 nm, which is the same as $L_{min}$ of 65 nm

FIG. 14

ENHANCED DYNAMIC RANDOM ACCESS MEMORY (EDRAM)-BASED COMPUTING-IN-MEMORY (CIM) CONVOLUTIONAL NEURAL NETWORK (CNN) ACCELERATOR

CROSS REFERENCE TO THE RELATED APPLICATIONS

The application is the national phase entry of International Application No. PCT/CN2022/110410, filed on Aug. 5, 2022, and claims priority on Chinese patent application No. 202111169936.3 filed on Oct. 8, 2021, the entire contents of which are incorporated herein by reference.

TECHNICAL FIELD

The present disclosure relates to an enhanced dynamic random access memory (eDRAM)-based computing-in-memory (CIM) convolutional neural network (CNN) accelerator.

BACKGROUND

In various deep neural network (DNN) structures, a CNN proposed by LeCun in 1989 [1] is the most widely used. In its early stage, CNN was successfully applied to handwritten character recognition and image recognition [1-3]. In 2012, a deep network, namely, AlexNet [4], was successful. From then on, CNN has developed vigorously and been widely used in various fields, achieving the best results on many issues. After the emergence of the AlexNet, CNN is rapidly applied to various tasks of machine vision, including pedestrian detection, face recognition, object segmentation, object tracking, and the like, and achieves success [5-8]. In terms of hardware implementation, as a promising computing platform, CIM is used to realize an artificial intelligence-based on a neural network with a high throughput constraint. Although static random-access memory (SRAM)-based CIM has recently achieved a considerable throughput in both analog and digital fields [9-11], some eDRAM-based CIM [12,13] designs have achieved a higher throughput. However, as shown in FIG. 1, a current multi-bit eDRAM-based CIM CNN accelerator still faces some challenges in further improving throughput.

CITED REFERENCES

[1] Y. LeCun, B. Boser, J. S. Denker, D. Henderson, R. E. Howard, W. Hubbard, and L. D. Jackel. Backpropagation applied to handwritten zip code recognition. Neural Computation, 1989.

[2] Y. LeCun, B. Boser, J. S. Denker, D. Henderson, R. E. Howard, W. Hubbard, and L. D. Jackel. Handwritten digit recognition with a back-propagation network. In David Touretzky, editor, Advances in Neural Information Processing Systems 2 (NIPS*89), Denver, CO, 1990, Morgan Kaufman.

[3] Y. LeCun, L. Bottou, Y. Bengio, and P. Haffner. Gradient-based learning applied to document recognition. Proceedings of the IEEE, November 1998.

[4] Alex Krizhevsky, Ilya Sutskever, Geoffrey E. Hinton. ImageNet Classification with Deep Convolutional Neural Networks.

[5] P. Yang, G. Zhang, L. Wang, L. Xu, Q. Deng and M. -H. Yang, "A Part-Aware Multi-Scale Fully Convolutional Network for Pedestrian Detection," in IEEE Transactions on Intelligent Transportation Systems, vol. 22, no. 2, pp. 1125-1137, February 2021.

[6] Y. Huang and H. Hu, "A Parallel Architecture of Age Adversarial Convolutional Neural Network for Cross-Age Face Recognition," in IEEE Transactions on Circuits and Systems for Video Technology, vol. 31, no. 1, pp. 148-159, January 2021.

[7] L. Ma, Y. Li, J. Li, W. Tan, Y. Yu, and M. A. Chapman, "Multi-Scale Point-Wise Convolutional Neural Networks for 3D Object Segmentation From LiDAR Point Clouds in Large-Scale Environments," in IEEE Transactions on Intelligent Transportation Systems, vol. 22, no. 2, pp. 821-836, February 2021.

[8] J. Fang and G. Liu, "Visual Object Tracking Based on Mutual Learning Between Cohort Multiscale Feature-Fusion Networks With Weighted Loss," in IEEE Transactions on Circuits and Systems for Video Technology, vol. 31, no. 3, pp. 1055-1065, March 2021.

[9] J. Yue et al., "14.3 A 65 nm Computing-in-Memory-Based CNN Processor with 2.9-to-35.8TOPS/W System Energy Efficiency Using Dynamic-Sparsity Performance-Scaling Architecture and Energy-Efficient Inter/Intra-Macro Data Reuse," ISSCC, pp. 234-236, 2020.

[10] Q. Dong et al., "A 351TOPS/W and 372.4GOPS Compute-in-Memory SRAM Macro in 7 nm FinFET CMOS for Machine-Learning Applications", ISSCC, pp. 242-243, 2020.

[11] Y. -D. Chih et al., "16.4 An 89TOPS/W and 16.3TOPS/mm2 All-Digital SRAM-Based FullPrecision Compute-In Memory Macro in 22 nm for Machine-Learning Edge Applications," ISSCC, pp. 252-254, 2021.

[12] Z. Chen et al., "15.3 A 65 nm 3T Dynamic Analog RAM-Based Computing-in-Memory Macro and CNN Accelerator with Retention Enhancement, Adaptive Analog Sparsity and 44TOPS/W System Energy Efficiency," ISSCC, pp. 240-242, 2021.

[13] S. Xie et al., "16.2 eDRAM-CIM: Compute-In-Memory Design with Reconfigurable EmbeddedDynamic-Memory Array Realizing Adaptive Data Converters and Charge-Domain Computing," ISSCC, pp. 248-250, 2021.

SUMMARY

The present disclosure is intended to provide a CIM CNN accelerator to improve a macro throughput, weight accuracy, and a degree of parallelism with fewer transistors, and improve the throughput of a successive approximation register analog-digital converter (SAR ADC) without adding area.

To achieve the above objective, the technical solution of the present disclosure is to provide an eDRAM-based CIM CNN accelerator, including four P2ARAM blocks. Each of the P2ARAM blocks includes a 5T1C ping-pong eDRAM bit cell array composed of 64×16 5T1C ping-pong eDRAM bit cells. Each of the 5T1C ping-pong eDRAM bit cells adopts a 5T1C circuit structure and has two 2T read ports. The two read ports are respectively connected to an accumulation bit line (ABL) 1 and an ABL 2. The two read ports correspond to two activation value input terminals respectively.

The two 2T read ports of the 5T1C ping-pong eDRAM bit cell support bit cell-based parallel in-memory convolution operations, and the two read ports complete convolution and bit line (BL) resetting in parallel in a cycle. The two parallel read ports operate in ping-pong mode. A read port performing BL resetting completes convolution in the next cycle, a read port performing convolution completes BL resetting in the next cycle, and the read port performing convolution calculation hides a pre-discharge overhead of a BL.

An eDRAM cell storage node of each of the 5T1C ping-pong eDRAM bit cells is configured to store an analog weight value and a voltage value with reverse turn-off noise generated by a noise compensation circuit. When a write transistor of each eDRAM cell storage node is turned off, forward turn-off noise and reverse turn-off noise stored in the eDRAM cell storage node are mutually offset, thereby reducing the impact of the noise on an analog weight value stored in the eDRAM cell storage node.

In each of the P2ARAM blocks, 64×2 digital time converters convert a 4-bit activation value into different pulse widths from a row direction and input the pulse widths into the 5T1C ping-pong eDRAM bit cell array for calculation. A total of 16×2 convolution results are output in a column direction of the 5T1C ping-pong eDRAM bit cell array. Convolution is realized by charging an input sampling capacitor of a SAR ADC unit by a plurality of 5T1C ping-pong eDRAM bit cells on the ABL at the same time, and a voltage value of the input sampling capacitor is read by the SAR ADC unit.

An input sampling capacitor on an ABL is combined into a SAR ADC unit connected to the ABL, and an area of the input sampling capacitor on the ABL is allotted to a C-DAC capacitor of the SAR ADC unit. Every two of 16 columns of 5T1C ping-pong eDRAM bit cells in the 5T1C ping-pong eDRAM bit cell array form a group. In one group, one column of 5T1C ping-pong eDRAM bit cells is a sign bit column, and the other column of 5T1C ping-pong eDRAM bit cells is a numerical bit column. An ABL 1 and an ABL 2 of the sign bit column each are connected to three SAR ADC units, and the SAR ADC unit is redefined as an RS ADC unit. An ABL 1 and an ABL 2 of the numerical bit column each are connected to three SAR ADC units, and the SAR ADC unit is redefined as an RM ADC unit, and 12 related SAR ADC units corresponding to a group of 5T1C ping-pong eDRAM bit unit columns are segmented and crossed. The three RS ADC units connected to the ABL 1 of the sign bit column cross with the three RM ADC units connected to the ABL 1 of the numerical bit column. The three RS ADC units connected to the ABL 2 of the sign bit column cross with the three RM ADC units connected to the ABL 2 of the numerical bit column. Two crossed SAR ADC units are configured to support the calculation of a non-2's complement and a 2's complement.

When the 2's complement is calculated, every two of the crossed RM ADC units and RS ADC units are combined into one ADC for conversion. In this case, the sign bit column is used to store a 1-bit sign value, and the numerical bit column is used to store a value of other bits such as five bits. An input sampling capacitor of the RS ADC unit obtains a result of sign bit multiplication, and an input sampling capacitor of the RM ADC unit obtains a result of numerical bit multiplication. The input sampling capacitor of the RS ADC unit and the input sampling capacitor of the RM ADC unit directly read a 6-bit 2's complement by using the RS ADC unit.

When the non-2's complement is calculated, the RM ADC unit and the RS ADC unit perform conversion independently. In this case, the sign bit column and the numerical bit column are calculated independently, and both the sign bit column and the numerical bit column store a 5-bit non-2's complement. The RM ADC unit and the RS ADC unit simultaneously read the 5-bit non-2's complement for their respective input sampling capacitors.

Operation control logic and skipping control logic of the SAR ADC unit are tightly coupled in a bit-serial mode to support cross-layer calculation and early termination of a convolution layer, an activation function layer, and a maximum pooling layer at the same time.

Preferably, the 5T1C ping-pong eDRAM bit cell uses a negative channel metal oxide semiconductor (NMOS) transistor as the write transistor and uses a positive channel metal oxide semiconductor (PMOS) transistor to provide the two 2T read ports.

Preferably, the noise compensation circuit includes an operational amplifier and a write noise compensation cell (WNCC). A target current is permutated, combined, and stacked to obtain a unit current that is 0 to 32 times the target current. After the magnification of the target current is set, the operational amplifier calculates an analog voltage required by the eDRAM cell storage node. The analog voltage is written into 20 WNCCs by using write transistors of the WNCCs, and then a write transistor of each WNCC is turned off and a read transistor of each WNCC is turned on. In this case, the reverse turn-off noise is obtained for the analog voltage stored in the 20 WNCCs, and the analog voltage with the reverse turn-off noise drives each write bit line (WBL) by using a rear-stage voltage follower to write the analog voltage with the reverse turn-off noise into each eDRAM cell storage node of the 5T1C ping-pong eDRAM bit cell array by row.

Preferably, the 5T1C ping-pong eDRAM bit cell supports intra-image and inter-image parallel convolution modes.

In the intra-image parallel convolution mode, the 5T1C ping-pong eDRAM bit cell segments and convolves the same picture, an ABL 1 corresponding to one activation value input terminal obtains a convolution operation result of a pixel or an activation value of an upper half of the picture, and an ABL 2 corresponding to another activation value input terminal obtains a convolution operation result of a pixel or an activation value of a lower half of the picture.

In the inter-image parallel convolution mode, an ABL 1 corresponding to one activation value input terminal obtains a convolution operation result of a first picture, and an ABL 2 corresponding to another activation value input terminal obtains a convolution operation result of a second picture.

Preferably, the difference between the working phases of three SAR ADC units connected to the same ABL is exactly two cycles, such that a convolution result on the corresponding ABL is sampled circularly.

The CNN accelerator provided in the present disclosure uses the 5T1C ping-pong eDRAM bit cells to perform multi-bit storage and convolution in parallel. An S2M-ADC scheme is proposed to allot an area of an input sampling capacitor of an ABL to sign-numerical SAR ADC units of a CDAC array without adding area overhead. In this way, the eDRAM-based CIM CNN accelerator in the present disclosure achieves a peak computing density of 59.1 TOPS/mm$^2$, which is about 30 times higher than the computing density [9] in a previous design.

BRIEF DESCRIPTION OF THE DRAWINGS

FIG. 1C illustrates that the present disclosure uses fewer transistors to obtain higher weight accuracy and a higher degree of parallelism compared with the current SOTA design to improve throughput.

FIG. 1A illustrates the difference between specific structures of the present disclosure and the SOTA design.

FIG. 1B and FIG. 1C each illustrates differences between the present disclosure and the current SOTA design in terms of the number of transistors, weight accuracy, and a degree of parallelism.

FIG. 2 illustrates that the present disclosure improves the throughput of a SAR ADC without an additional area overhead.

FIG. 14 shows comparison results.

DETAILED DESCRIPTION OF THE EMBODIMENTS

The present disclosure will be described in detail below by referring to specific embodiments. It should be understood that these embodiments are only intended to describe the present disclosure, rather than to limit the scope of the present disclosure. In addition, it should be understood that various changes and modifications may be made to the present disclosure by those skilled in the art after reading the content of the present disclosure, and these equivalent forms also fall within the scope defined by the appended claims of the present disclosure.

Figure 1A:
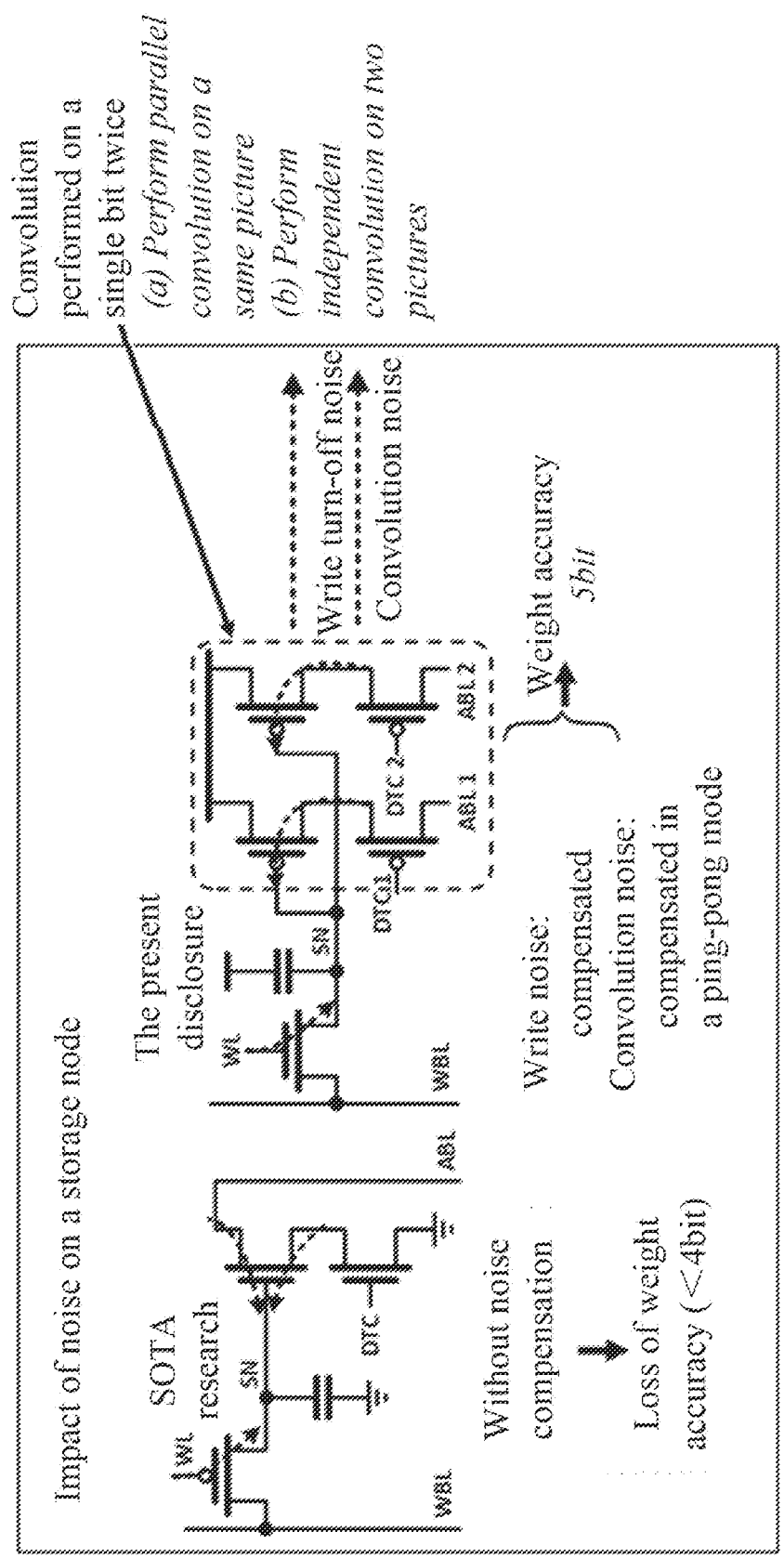
FIG. 1A, FIG. 1B, FIG. 1C, and FIG. 2 illustrate the challenges of a current state-of-the-art (SOTA) design and a design provided in the present disclosure, and the difference between them, where each of FIG. 1A, FIG. 1B.
Figure 1B:
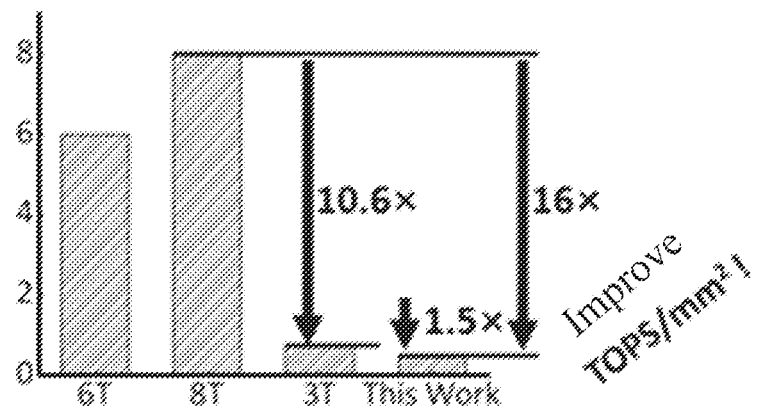
Figure 1C:
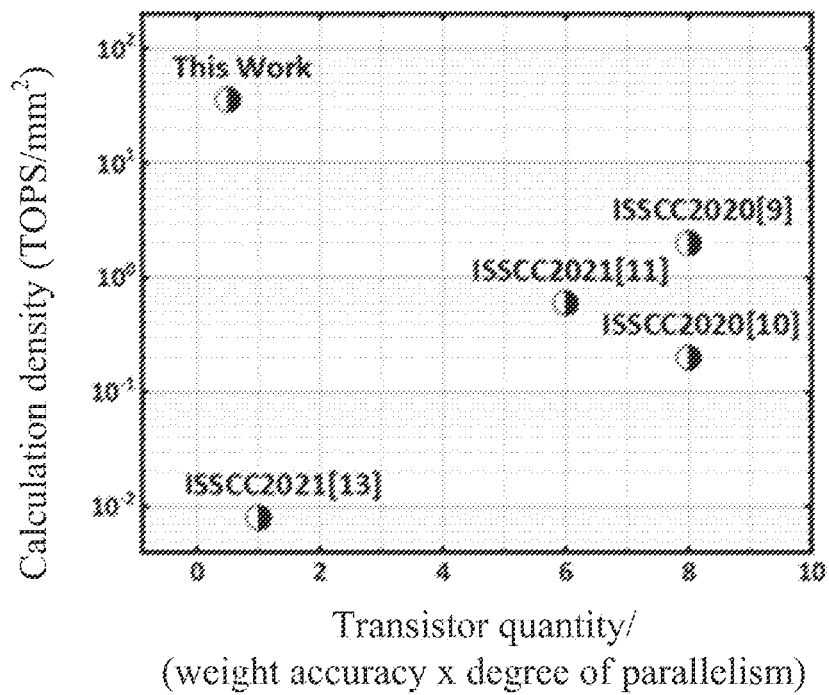
Figure 2:
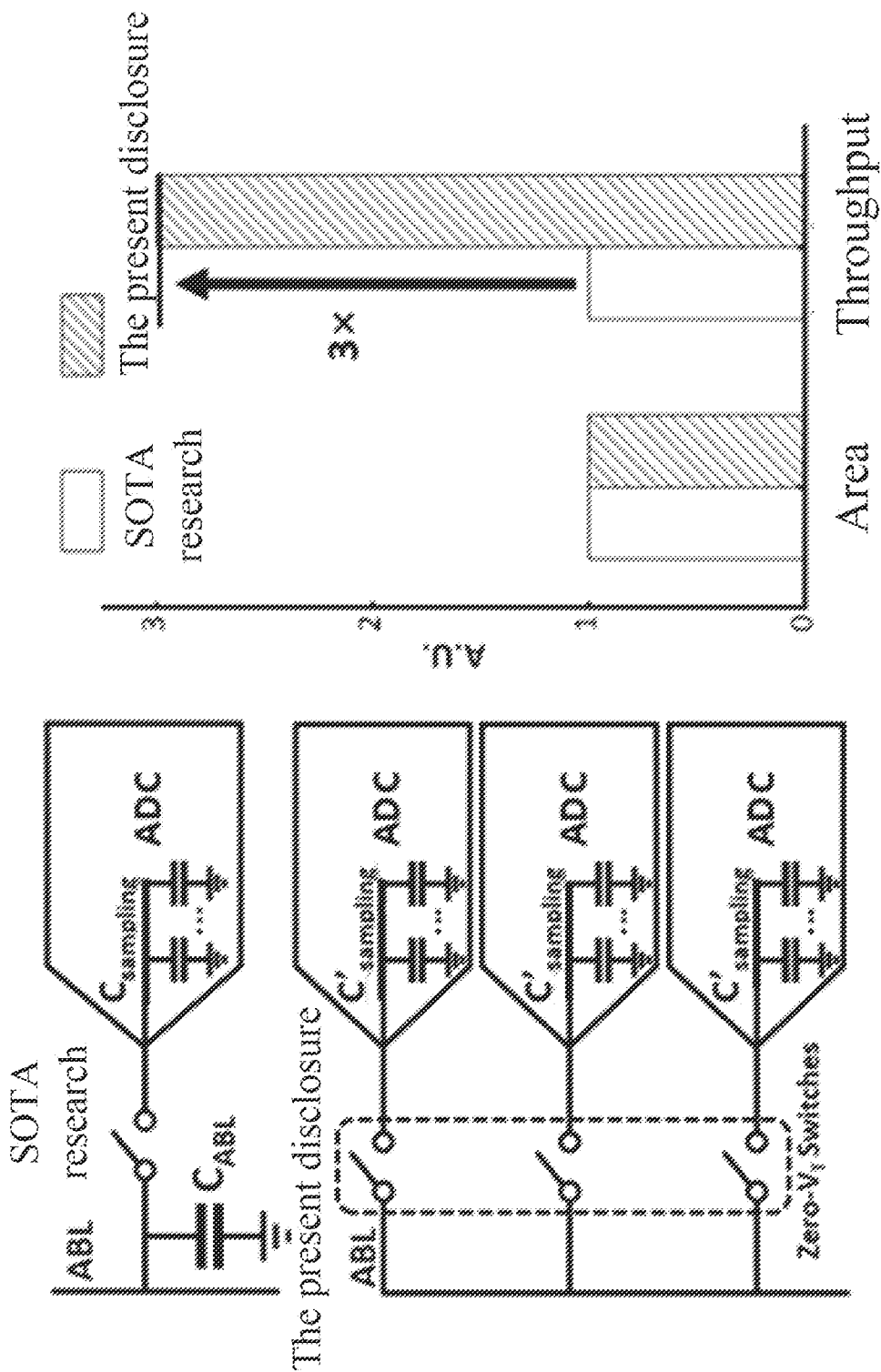
Figure 3:
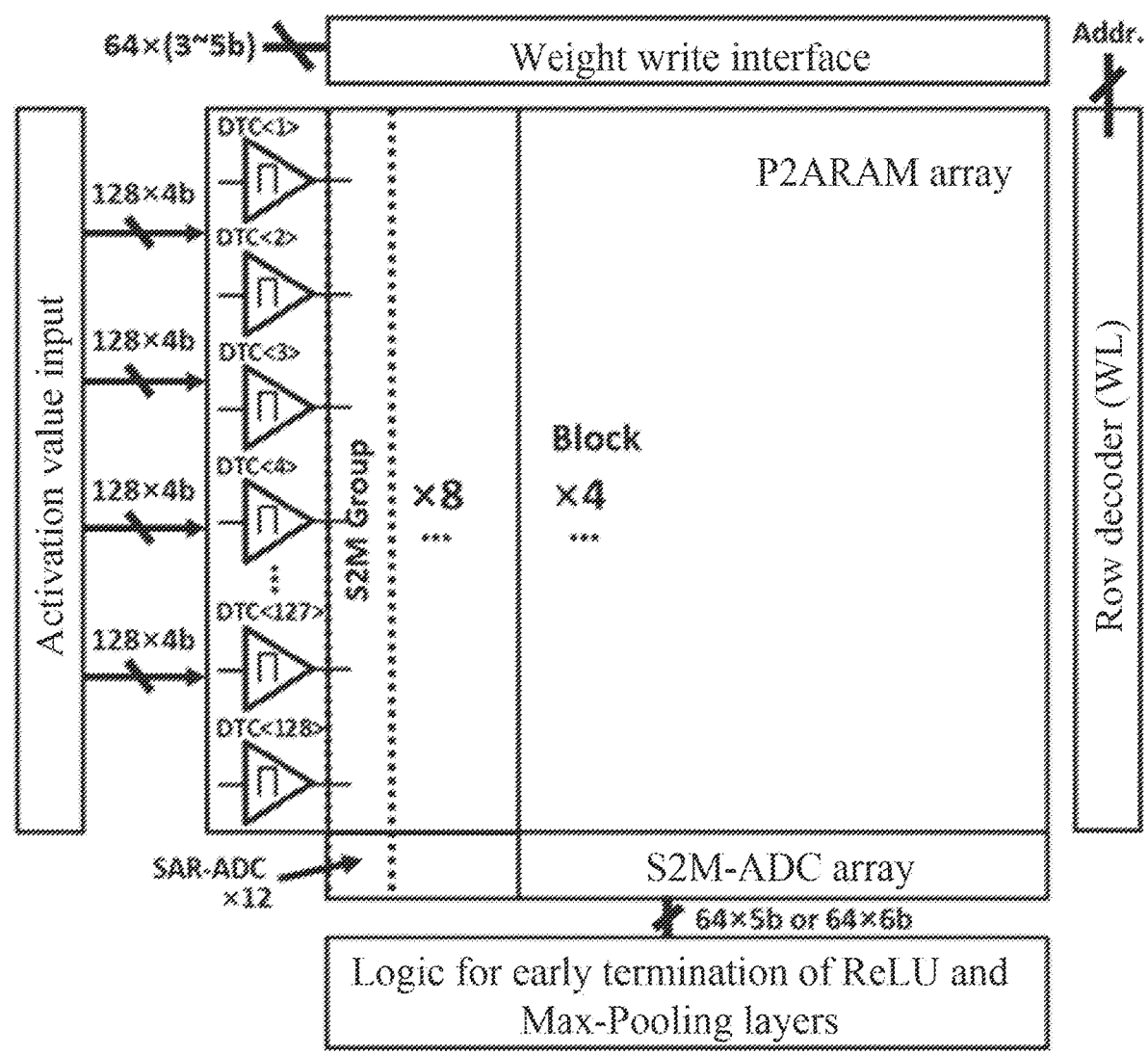
FIG. 3 is an overall architecture of the present disclosure.

As shown in FIG. 3, an eDRAM-based CIM CNN accelerator provided in the present disclosure includes four P2ARAM blocks. Each of the P2ARAM blocks includes a 5T1C ping-pong eDRAM bit cell array composed of 64×16 5T1C ping-pong eDRAM bit cells. The 5TIC ping-pong eDRAM bit cell is configured to perform multi-bit storage and parallel convolution.

Figure 4:
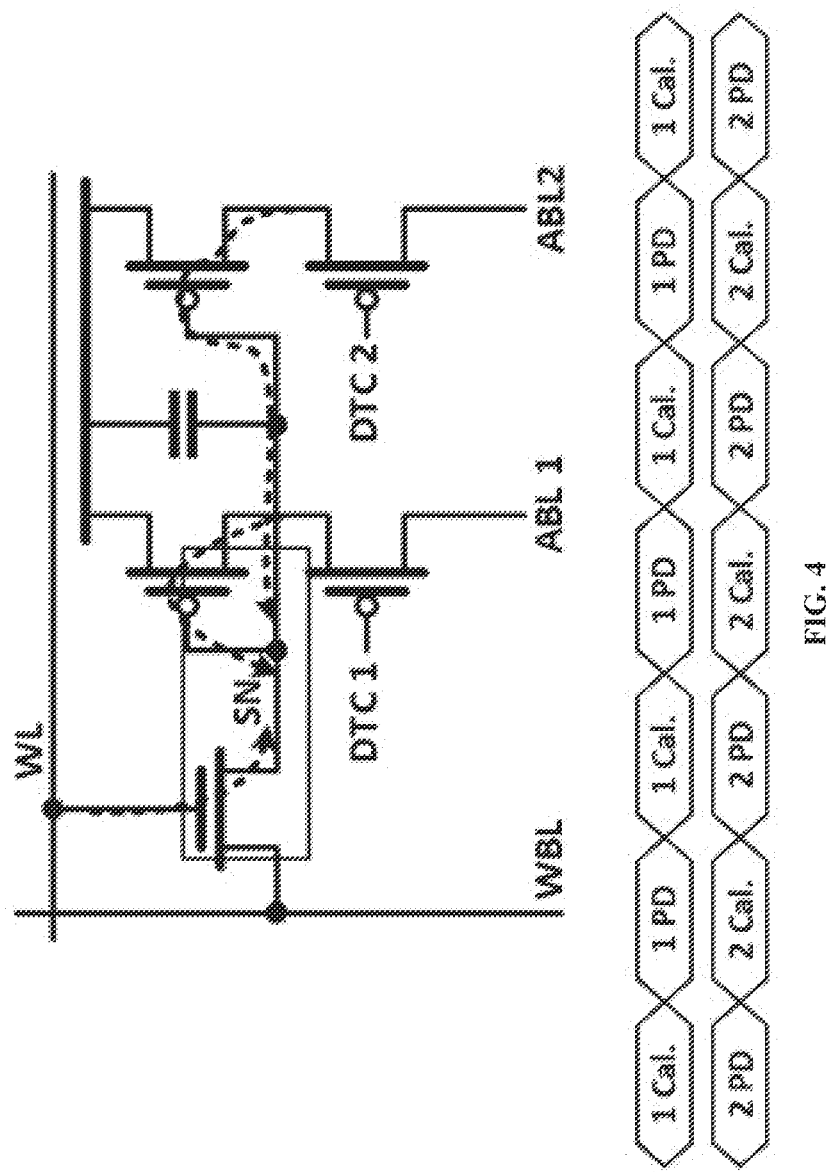
FIG. 4 is a principle diagram of a 5T1C ping-pong eDRAM bit cell, where 1Cal. represents a convolution operation on a DTC 1, 1PD represents a pre-discharge operation on an ABL 1, 2Cal. represents a convolution operation on a DTC 2, and 2PD represents a pre-discharge operation on an ABL 2.

Referring to FIG. 4, each of the 5T1C ping-pong eDRAM bit cells uses an NMOS transistor as a write transistor to perform a write operation and uses PMOS transistors as two 2T read ports. The two PMOS read ports of the 5T1C ping-pong eDRAM bit cell are respectively connected to ABL 1 and ABL 2 or ABL 3 and ABL4.

The two PMOS read ports respectively correspond to two PMOS activation value input terminals, namely, DTC 1 and DTC 2. The PMOS transistor is selected for a read operation, which is mainly intended to reduce an overall size of a sampling capacitor on an ABL, because compared with the NMOS transistor, the PMOS transistor can provide a lower calculation (charging) current in the case of a large pulse width of a DTC. In this way, all ABLs need to be discharged to a GND before a calculation operation. In the present disclosure, an SN node capacitor connected to a VDD has a stronger anti-noise capability than an SN node capacitor connected to the GND.

The two 2T read ports adopted by the 5T1C ping-pong eDRAM bit cell provided in the present disclosure support bit cell-based parallel in-memory convolution operations. For an ordinary single port, the following operations are required: convolution→BL resetting→convolution→BL resetting→convolution→BL resetting→ . . . . Therefore, it takes two cycles to complete one convolution operation. For the two 2T ports in the present disclosure, assuming that a PMOS read port connected to the ABL 1 or ABL 3 is read port 1 and a PMOS read port connected to the ABL 2 or ABL 4 is read port 2, the present disclosure can realize the following operations: convolution (the read port 1)+BL resetting (the read port 2)→BL resetting (the read port 1)+convolution (the read port 2)→ . . . That is, in the same cycle, the two PMOS read ports complete convolution and BL resetting in parallel in which a PMOS read port performing BL resetting (in other words, the PMOS read port is in a pre-discharge state) completes convolution in the next cycle while a PMOS read port performing convolution completes BL resetting in the next cycle. Therefore, in the present disclosure, the convolution operation can be completed in each cycle.

Figure 5:
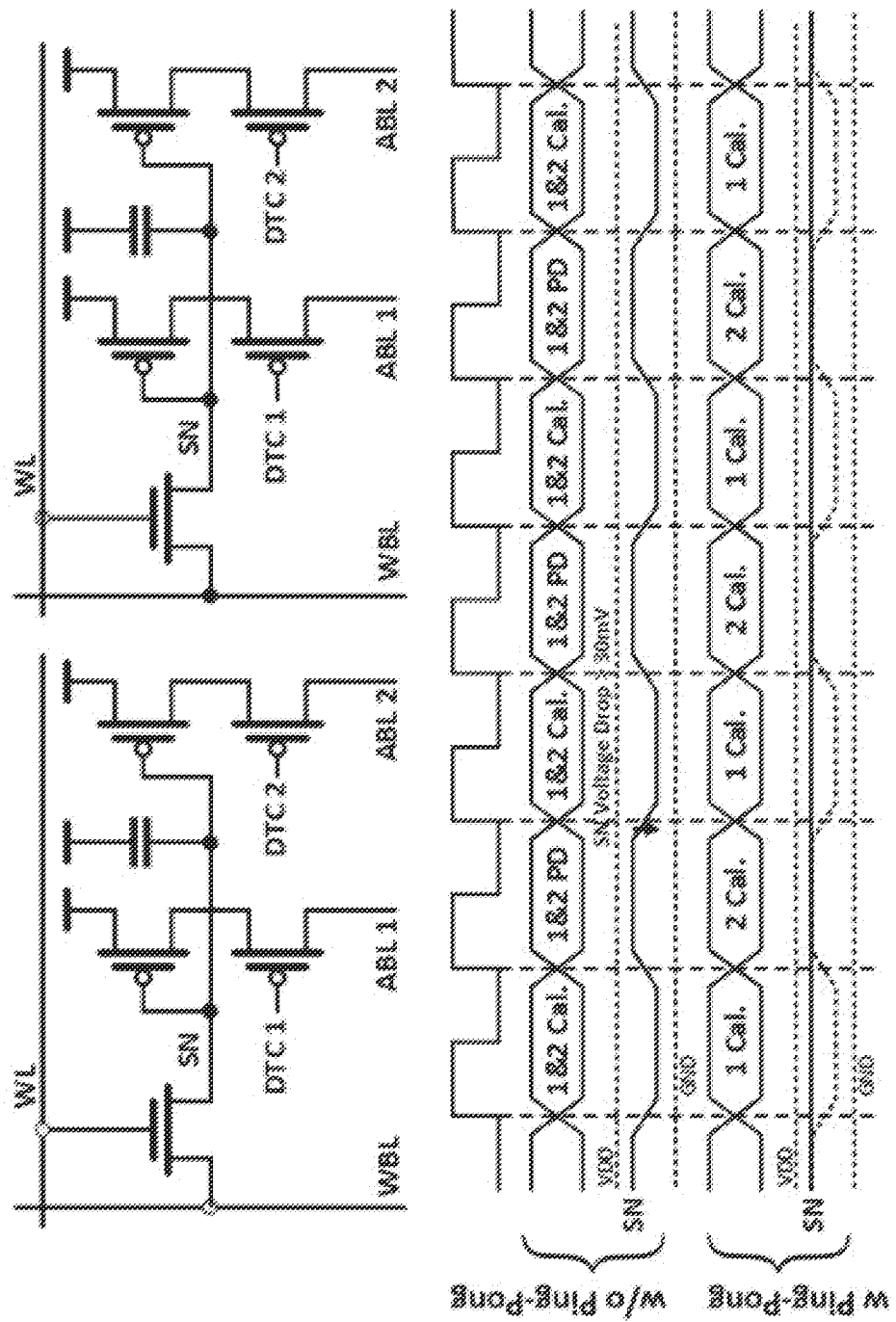
FIG. 5 is a schematic diagram of a ping-pong convolution mode.

As shown in FIG. 5, the two parallel PMOS read ports operate in a ping-pong mode, and a PMOS read port performing convolution calculation hides a pre-discharge overhead of a BL. Therefore, the 5T1C ping-pong eDRAM bit cell provided in the present disclosure increases throughput by 2 times. In addition, the ping-pong operation can significantly eliminate a noise coupling from a source (s) and a drain (d) to an SN node (g). The noise coupling is generated by parasitic capacitors $C_{gd}$ and $C_{gs}$.

Figure 6:
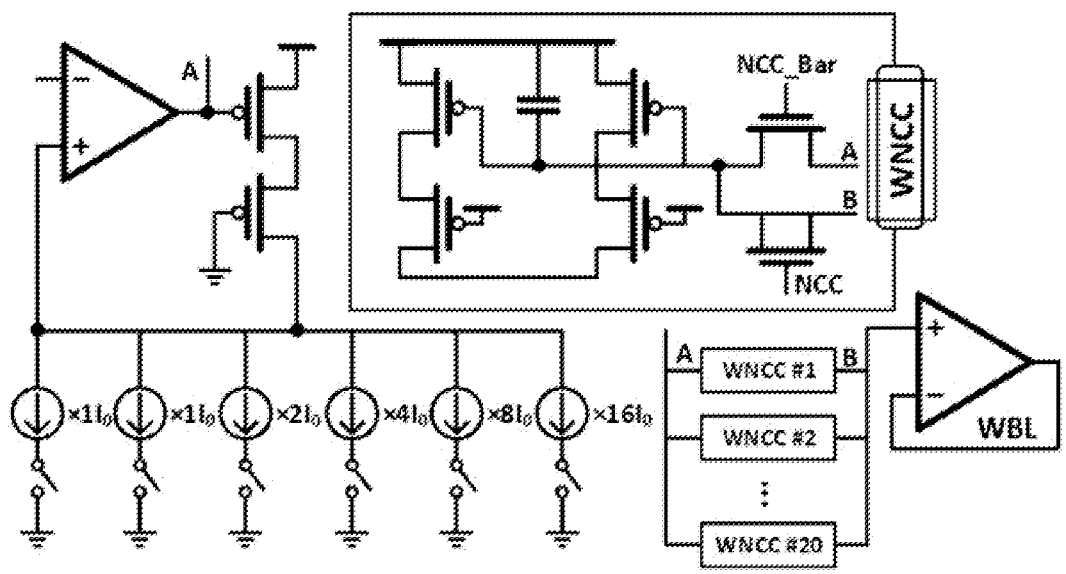
FIG. 6 is a schematic diagram of a write noise supplementation circuit.

An eDRAM cell storage node (hereinafter referred to as "SN node") of each 5T1C ping-pong eDRAM bit cell is configured to store an analog weight value and a voltage value with reverse turn-off noise. The reverse turn-off noise is generated by a noise compensation circuit composed of an operational amplifier and a WNCC. Referring to FIG. 6, a target current is permutated, combined, and stacked to obtain a unit current that is 0 to 32 times the target current. After a magnification of the target current is set, the operational amplifier calculates an analog voltage required by the SN node, and the analog voltage is written into 20 WNCCs by using write transistors of the WNCCs. Then, the control signal NCC_bar of each WNCC is switched from 1 to 0, such that the write transistor of the WNCC is turned off, and the control signal NCC of each WNCC is switched from 0 to 1, such that a read transistor of the WNCC is turned on. In this case, the reverse turn-off noise is obtained for the analog voltage stored in the 20 WNCCs, and the analog voltage with the reverse turn-off noise drives each WBL by using a rear-stage voltage follower to write the analog voltage with the reverse turn-off noise into each SN node of the 5T1C ping-pong eDRAM bit cell array by row. When a write transistor of each SN node is turned off, forward turn-off noise and reverse turn-off noise stored in the SN node are mutually offset. The present disclosure can effectively suppress coupling noise during the write operation by using the write noise compensation cell and generate a reverse noise amplitude in the write stage to compensate for write noise. In this way, the noise has the least impact on the analog weight value stored on the SN node, which is critical to the accuracy of reasoning.

Before convolution, a pre-trained digital weight value is input into the noise compensation circuit to generate the analog weight value. In the same way as above, the analog weight value is stored in each SN node of the 5T1C ping-pong eDRAM bit cell array by row by using a control signal on a word line (WL).

Figure 7:
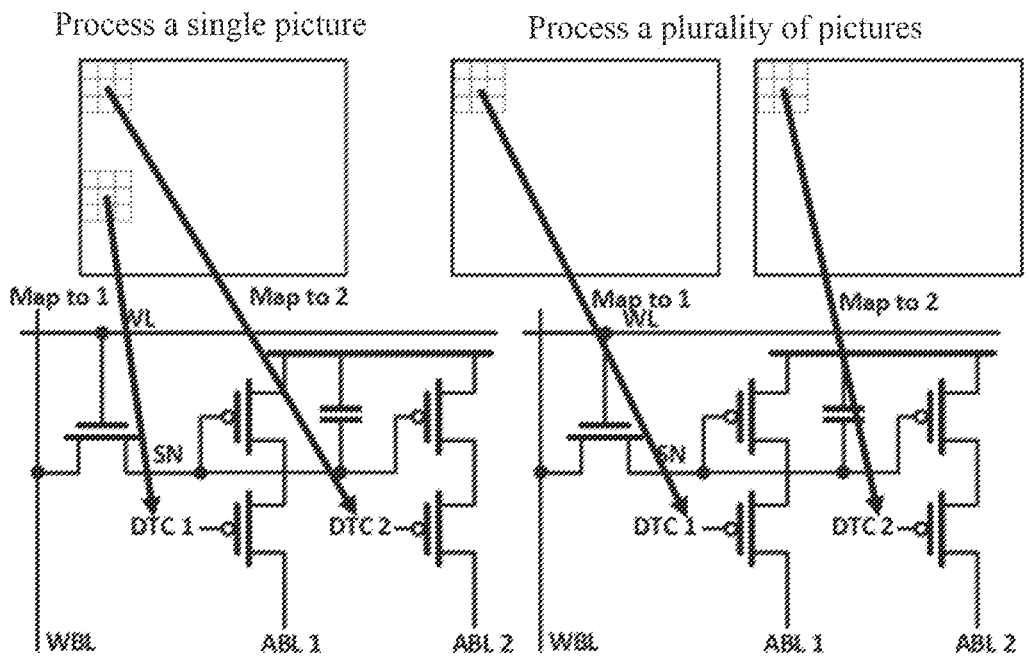
FIG. 7 is a schematic diagram of dual operation modes.
Figure 8:
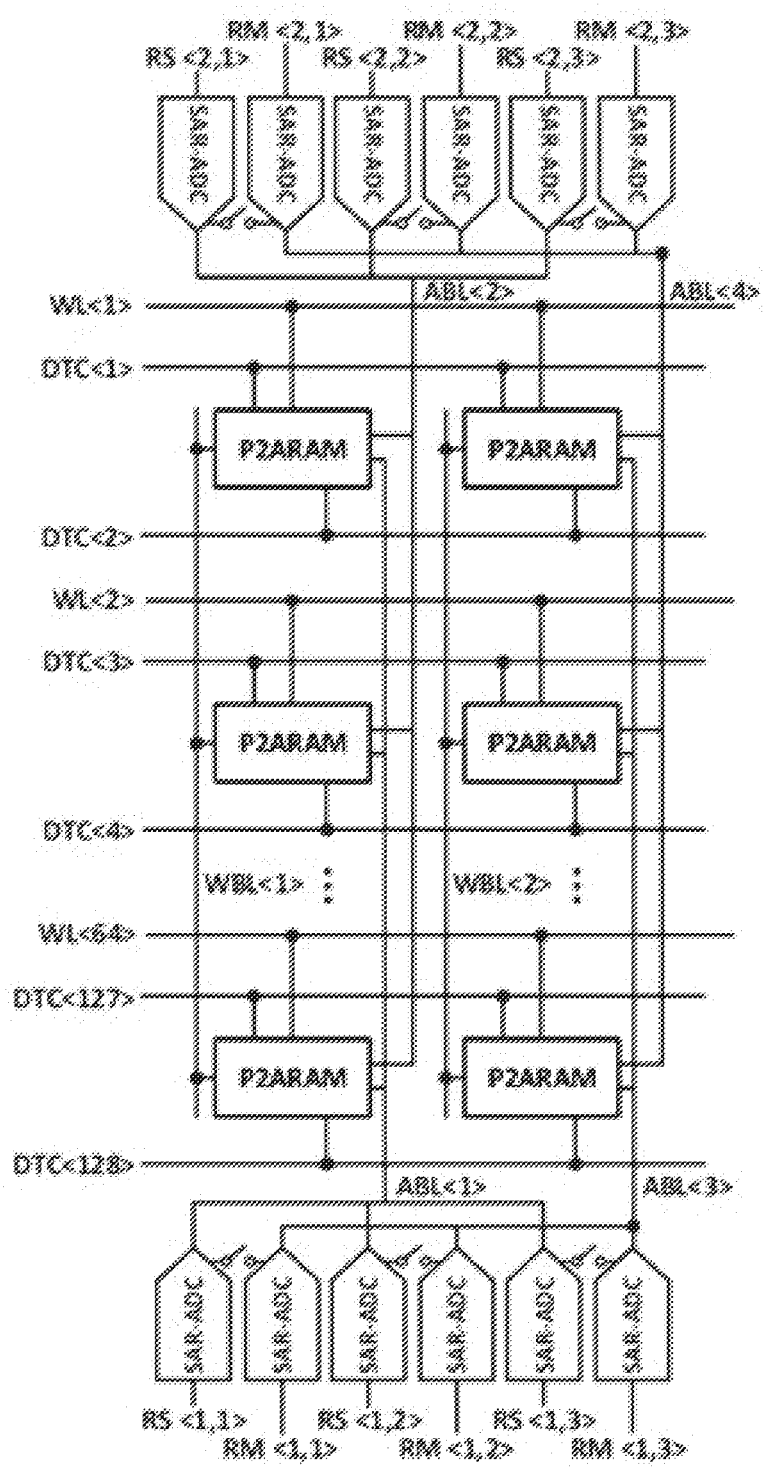
FIG. 8 is a schematic diagram of a combined S2M-ADC design.
Figure 9:
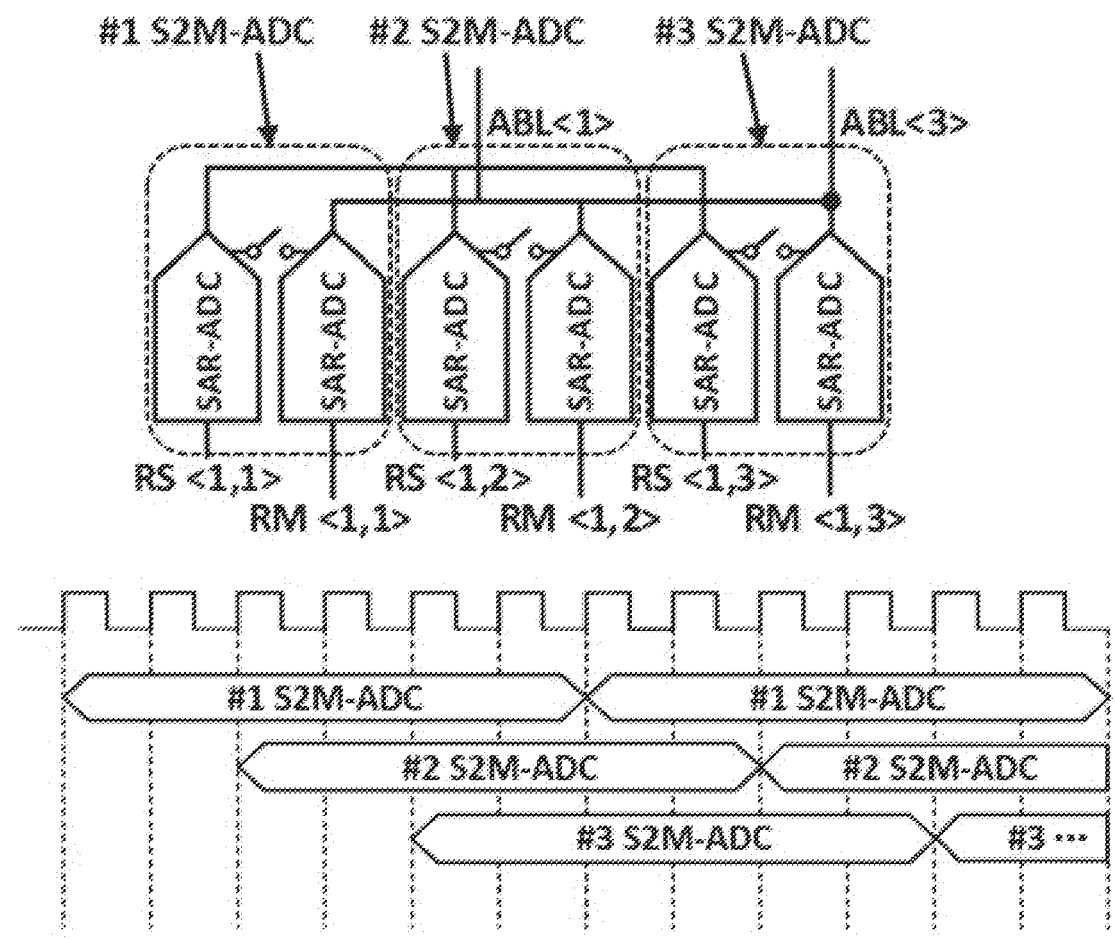
FIG. 9 is a schematic diagram of a SAR ADC-based pipelining S2M scheme according to the present disclosure.
Figure 10:
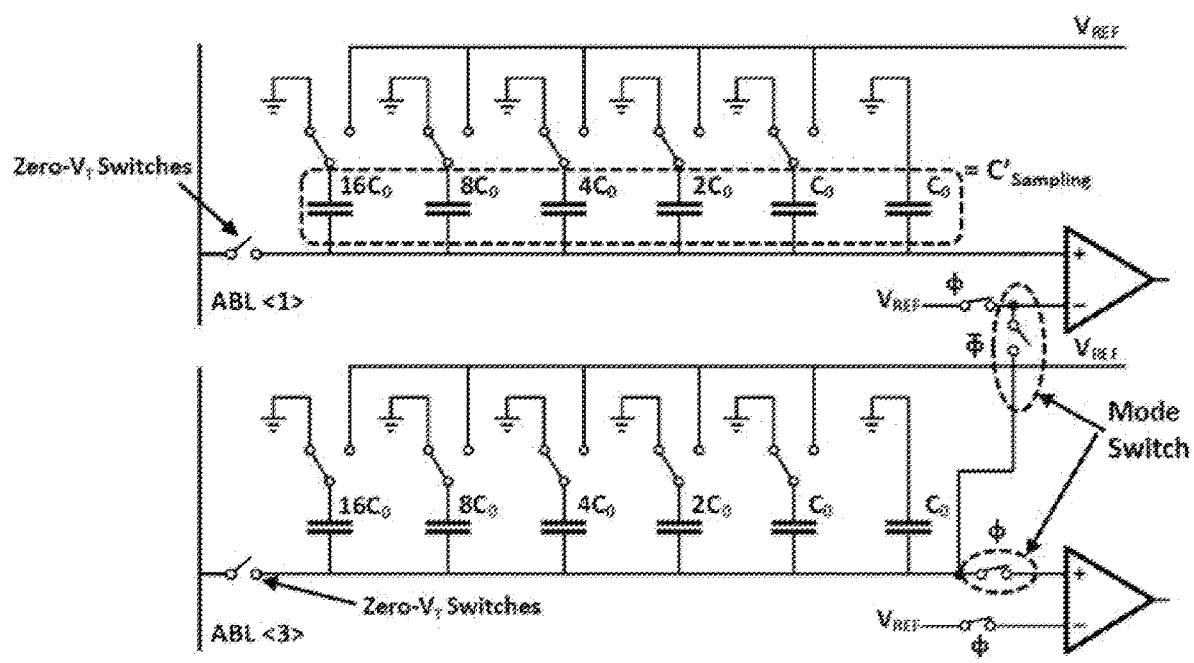
FIG. 10 is a schematic principle diagram of an S2M-ADC scheme.
Figure 11:
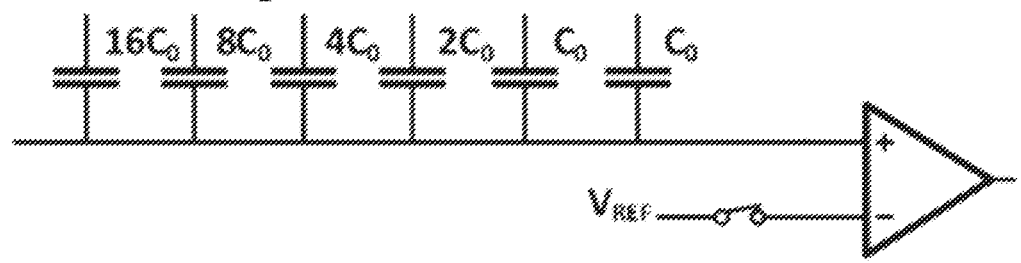
FIG. 11 is a schematic diagram of implementing a 2's complement/non-2's complement.
Figure 11:
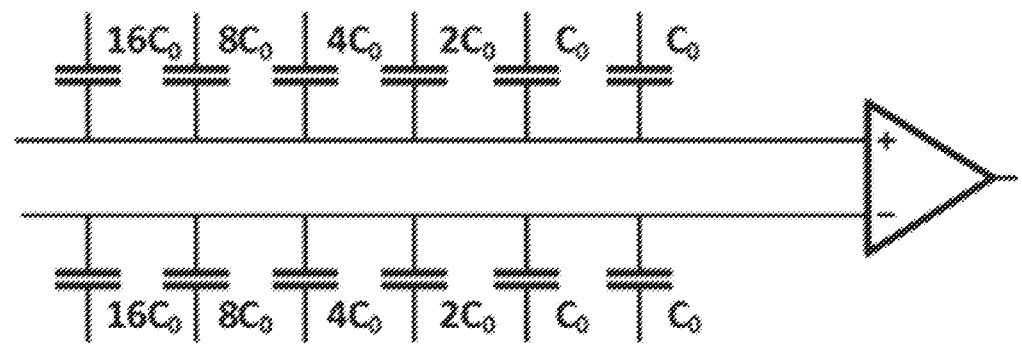

In addition, the 5T1C ping-pong eDRAM bit cell provided in the present disclosure supports intra-image and inter-image parallel convolution modes, as shown in FIG. 7. In the intra-image parallel convolution mode, the 5T1C ping-pong eDRAM bit cell segments and convolves the same picture, the ABL 1 corresponding to the PMOS activation value input terminal DTC 1 obtains a convolution operation result of a pixel or an activation value of the upper half of the picture, and the ABL 2 corresponding to the PMOS activation value input terminal DTC 2 obtains a convolution operation result of a pixel or an activation value of the lower half of the picture. The inter-image parallel convolution mode is applied to a scenario with two cameras. In the inter-image parallel convolution mode, the ABL 1 corresponding to the PMOS activation value input terminal DTC 1 obtains a convolution operation result of a first picture, and the ABL 2 corresponding to the PMOS activation value input terminal DTC 2 obtains a convolution operation result of a second picture.

In each of the P2ARAM blocks, 64×2 digital time converters (namely, DTCs) convert a 4-bit activation value into different pulse widths from a row direction and input the pulse widths into the 5TIC ping-pong eDRAM bit cell array for calculation. A total of 16×2 convolution (CONV) results are output in a column direction of the 5T1C ping-pong eDRAM bit cell array. Convolution is realized by charging an input sampling capacitor of a SAR ADC unit by a plurality of 5TIC ping-pong eDRAM bit cells on the ABL at the same time. A constant current charging value of each 5T1C ping-pong eDRAM bit cell is determined by the voltage value stored by the SN node. A smaller voltage value stored leads to a greater constant current value, and a larger voltage value stored leads to a smaller constant current value. Constant-current discharging time of each 5T1C ping-pong eDRAM bit cell is determined by the pulse width of the DTC. A wider pulse leads to longer charging time. A result of mixed charging is obtained by an input sampling capacitor, and the result of the mixed charging is a final convolution result. Finally, the voltage value of the input sampling capacitor is read by using a SAR ADC.

In the present disclosure, an input sampling capacitor on an ABL is combined into the SAR ADC unit connected to the ABL, and an S2M-ADC scheme is proposed. In the present disclosure, a connection mode of the SAR ADC unit and the 5T1C ping-pong eDRAM bit cell array is shown in FIG. 7. Every two of 16 columns of 5T1C ping-pong eDRAM bit cells in the 5T1C ping-pong eDRAM bit cell array form a group. In one group, one column of 5T1C ping-pong eDRAM bit cells is a sign bit column, and the other column of 5T1C ping-pong eDRAM bit cells is a numerical bit column. In this case, the ABL 1 and the ABL 2 of the sign bit column each are connected to three SAR ADC units, and the SAR ADC unit is redefined as an RS ADC unit, where RS stands for result of sign. The ABL 3 and the ABL 4 of the numerical bit column each are connected to three SAR ADC units, and the SAR ADC unit is redefined as an RM ADC unit, where RM stands for result of magnitude. The above 12 related SAR ADC units are segmented and crossed, where the three RS ADC units connected to the ABL 1 cross with the three RM ADC units connected to the ABL 3, and the three RS ADC units connected to the ABL 2 cross with the three RM ADC units connected to the ABL 4. Two crossed SAR ADC units are configured to support the calculation of a non-2's complement and a 2's complement.

The difference between the working phases of three SAR ADC units connected to the same ABL is exactly two cycles. In other words, after the first SAR ADC unit starts to work, the second SAR ADC unit starts to work in a third cycle, and the third SAR ADC unit starts to work in a fifth cycle. In this way, a convolution result on the corresponding ABL is sampled circularly.

When the 2's complement is calculated, every two of the crossed RM ADC units and RS ADC units are combined ($\phi=0$ and $\bar{\phi}=1$) into one ADC for conversion. In this case, the sign bit column is used to store a 1-bit sign value, and the numerical bit column is used to store the value of other bits such as five bits. An input sampling capacitor of the RS ADC unit obtains the result of the sign bit multiplication, and an input sampling capacitor of the RM ADC unit obtains the result of the numerical bit multiplication. The input sampling capacitor of the RS ADC unit and the input sampling capacitor of the RM ADC unit directly read a 6-bit 2's complement by using the RS ADC unit.

When the non-2's complement is calculated, the RM ADC unit and the RS ADC unit perform conversion independently ($\phi=1$ and $\bar{\phi}=0$). In this case, the sign bit column and the numerical bit column are calculated independently, and both the sign bit column and the numerical bit column store a 5-bit non-2's complement. The RM ADC unit and the RS ADC unit simultaneously read the 5-bit non-2's complement for their respective input sampling capacitors.

Operation control logic and skipping control logic of the SAR ADC unit are tightly coupled in a bit-serial mode to support cross-layer calculation and early termination of a convolution layer (CONV), an activation function layer (ReLU), and a maximum pooling layer (Max-Pooling) at the same time. This can save energy without loss of accuracy to achieve full on-chip computing in the case of a reconfigurable kernel of the maximum pooling layer.

VGG16 is taken as an example: (1) If the convolution layer is followed by only the ReLU layer. If the first bit is "1" (indicating that a negative number has been sampled), the ADC is terminated in advance and no longer performs reading because a ReLU function must give a result of 0 for any negative value. A subsequent bit is converted if the first bit read is "0" (indicating that a positive number has been sampled). (2) If the convolution layer is followed by both the ReLU layer and the maximum pooling layer. If the first bit is "1" (indicating that a negative number has been sampled), the ADC is terminated in advance and no longer performs reading because a ReLU function must give a result of 0 for any negative value. A subsequent bit is converted if the first bit read is "0" (indicating that a positive number has been sampled). If a kernel of the maximum pooling layer is 2×2, the maximum value in 2×2 needs to be selected and other values need to be terminated in advance.

In a subsequent comparison process, a SAR ADC unit that first outputs a result stores the result in a digital register, and the other three numbers need to be compared with values in the register bit by bit. If a bit of a value is found to be greater than the register's value, the register's value is replaced with the value (the value is possibly the maximum value). If a bit of a value is found to be less than the register's value, the value is read by terminating in advance (the value must not be the maximum value). If a bit of a value is found to be equal to the register's value, the next bit is continuously read for comparison.

Figure 12:
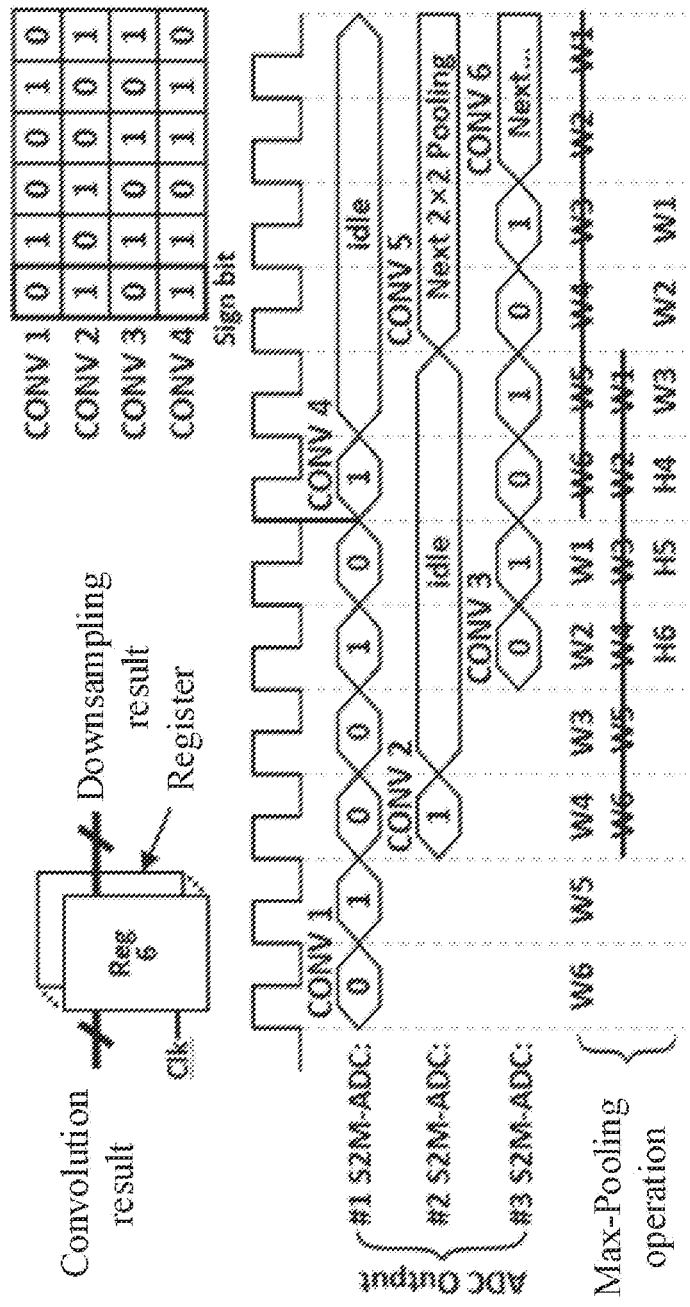
FIG. 12 is a schematic diagram of the early termination of ReLU and Max-Pooling layers.

Compared with a SOTA design, the present disclosure allots an area of a metal-oxide-metal (MOM) capacitor for ABL sampling to a C-DAC capacitor for the SAR ADC, which enables three SAR ADC units for each BL without an excess area overhead. Three SAR ADC units on the same BL are pipelined. Under the delay determined by the SAR ADC unit, all SAR ADC units work in parallel under a non-2's complement operation to improve overall throughput. Two adjacent SAR ADC units are combined by using a mode conversion switch to realize a 2's complement operation. A local NMOS device (Zero-VT) is used to implement a sampling switch, and a −200 mV power rail is used to turn off the sampling switch. FIG. 12 shows the skipping control principles of the ReLU and Max-Pooling layers. Based on the skipping control principles, the processing of different computing layers such as the CONV layer, the ReLU layer, and the Max-Pooling layer can be closely implemented. Because the SAR ADC unit provides an output sequentially from the highest bit to the lowest bit, a skipping-type controller can perform sign bit detection, bit-serial comparison, and early termination. A termination signal is also used to disable the conversion of the SAR ADC unit to maximally save energy in this stage. When VGG16 is implemented and a CIFAR-10 dataset is tested, the S2M-ADC scheme provided in the present disclosure can reduce power consumption by about 1.82 times.

Figure 13A:
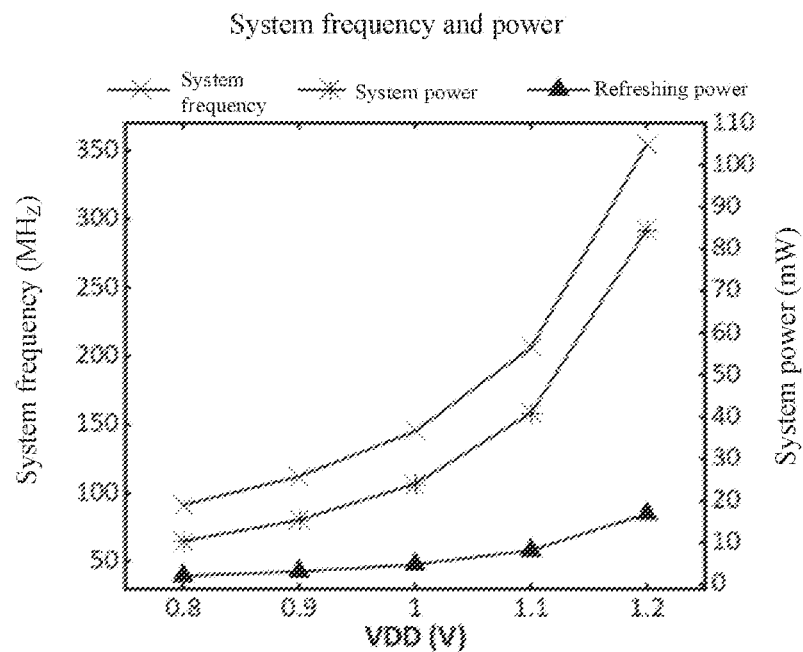
FIG. 13A-D show measurement results.

FIG. 13A-D show measurement results of a 4Kb CIM-based P2ARAM accelerator test chip made by using a 55 nm CMOS process. The chip can work reliably under a 0.8 to 1.2 V power supply, and its power consumption is 10.4 to 84.7 mW at a frequency of 91.2 to 354.6 MHz, as shown in FIG. 13A. Since storage weight needs to be refreshed regularly after 1 LSB is lost, power consumption for the refreshing operation is 2.1 to 16 MW under a power supply from 0.8 V to 1.2 V, accounting for about 21% of total power consumption of the system.

Figure 13B:
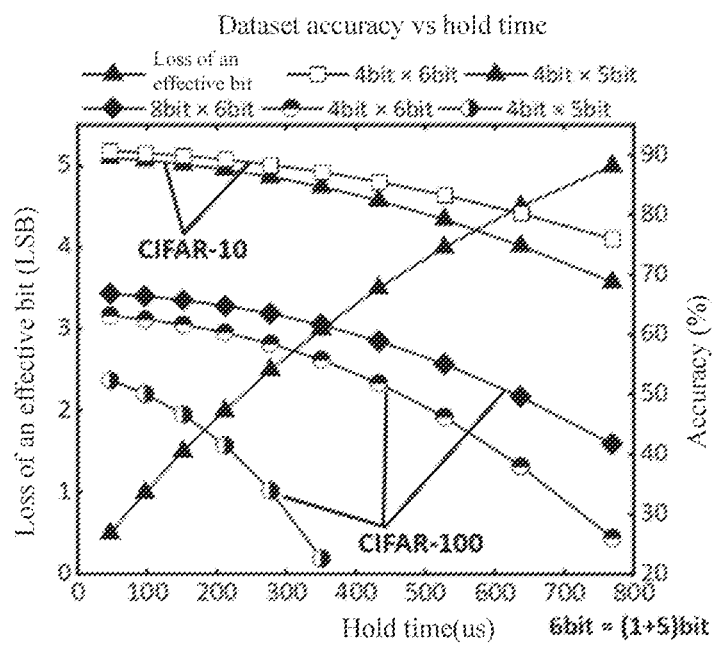
Figure 13C:
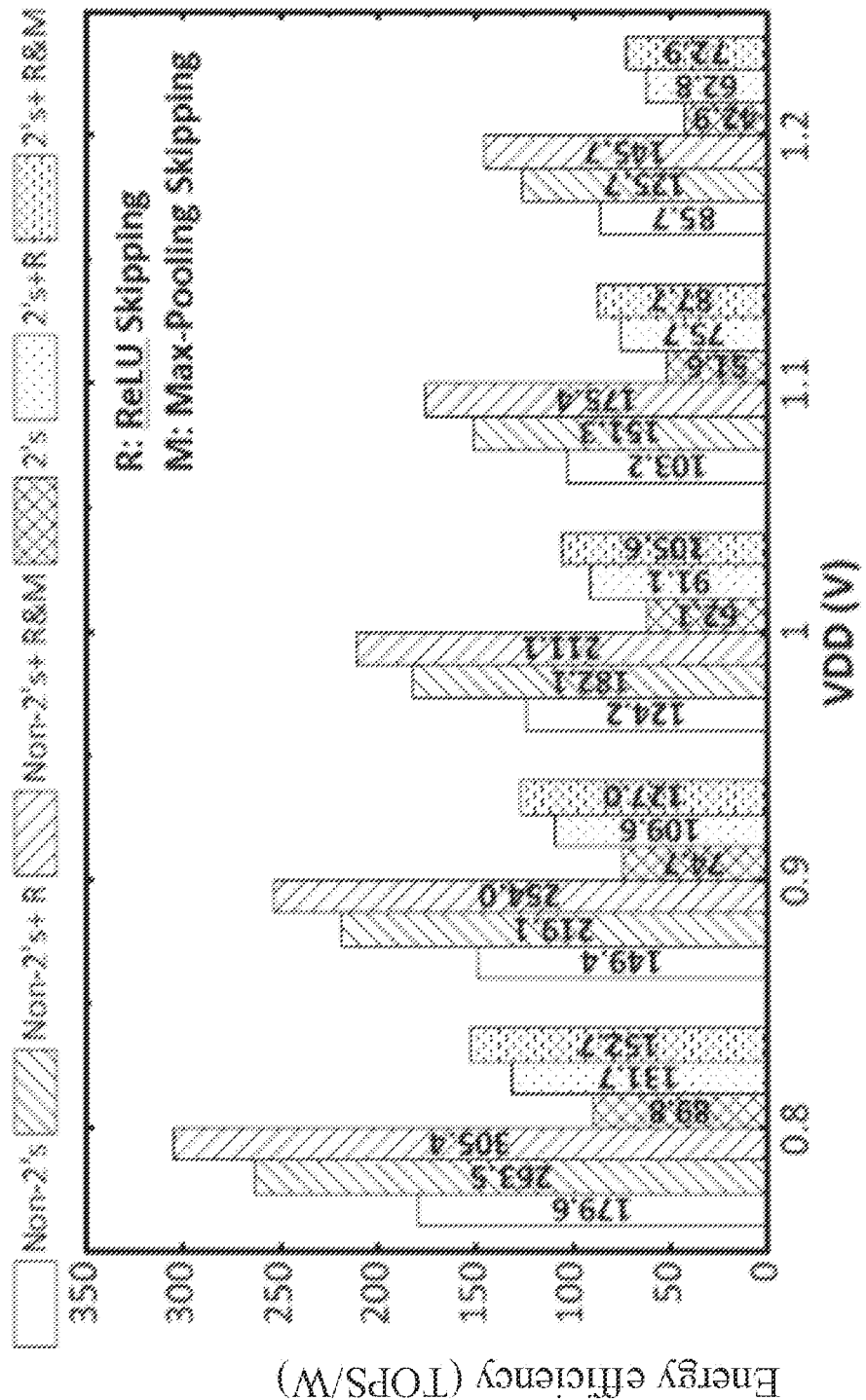
Figure 13D:
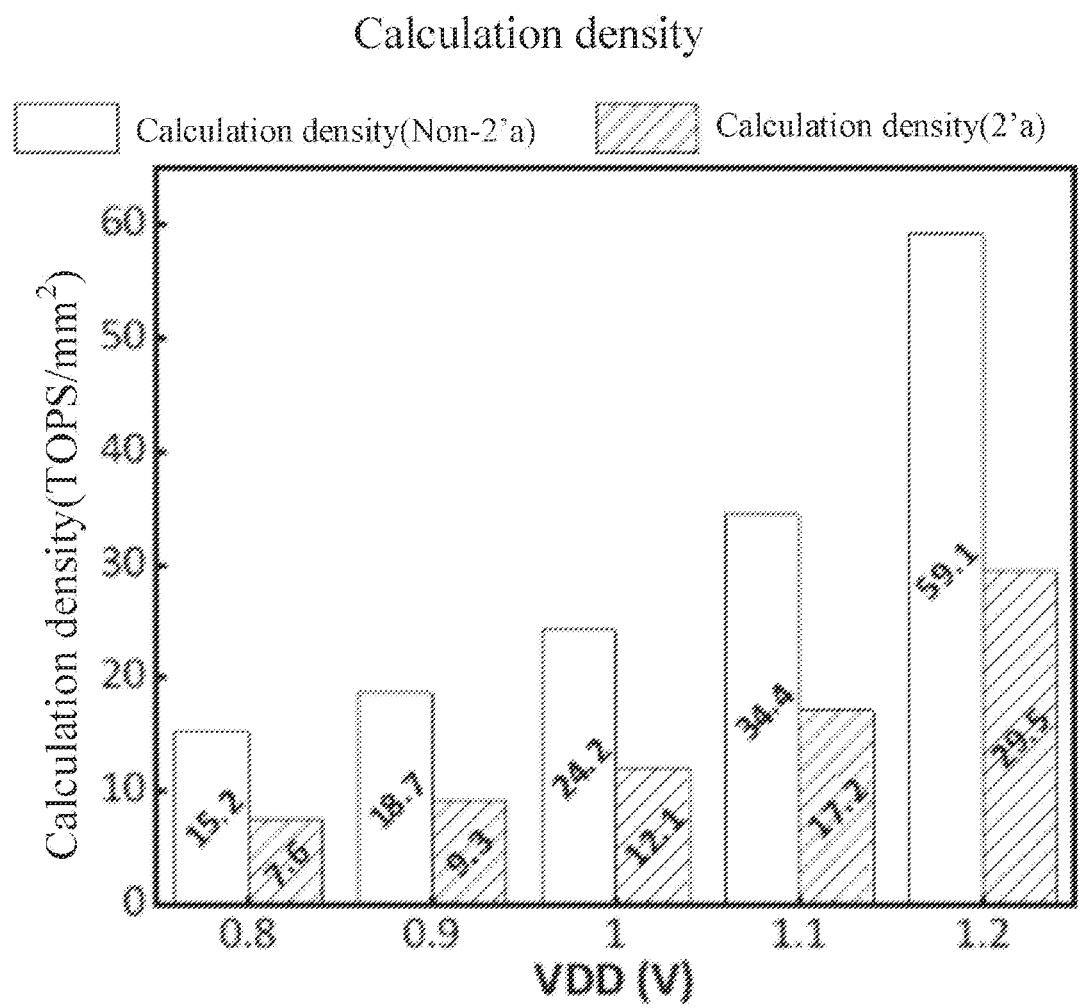

FIG. 13B shows the test accuracy of CIFAR-10 and CIFAR-100 datasets under different activation and weight accuracy configurations. It can be seen that in 2's (4b×6b) and non-2's (4b×5b) modes, the reasoning accuracy of the CIFAR-10 dataset has better tolerance than that of the CIFAR-100 dataset, and the reasoning accuracy of the CIFAR-100 dataset is more vulnerable to the reduction of activation accuracy and weight accuracy. In addition, a voltage drift of 1 LSB on the SN node causes a significant accuracy loss. In the 2's mode, the CIFAR-10 dataset achieves an overall accuracy of 90.68% and a bit accuracy of 4b×6b. Compared with reference accuracy, the accuracy of the CIFAR-100 dataset is 66.82%, which is acceptable, and the bit accuracy is 8b×6b. In addition, the advanced solutions of the ReLU and Max-Pooling layers reduce power usage by 1.82 times on average. As shown in FIG. 13C, the peak system energy efficiency of the non-2's complement mode at 0.8 V is 305.4 TOPS/W, while the energy efficiency of the 2's complement mode at 0.8 V is reduced by half (152.7 TOPS/W). As shown in FIG. 13D, in the non-2's complement mode, a peak computing density at 1.2 V is 59.1 TOPS/mm2, which is about 30 times higher than the existing computing density in a previous design.

FIG. 14 summarizes the comparison of the present disclosure and previous research. The present disclosure supports 2's and non-2's complement CONV operations, can calculate 4b/8b-type activation values and 3/4/5/6b-type weights, and is commonly used in a multi-bit quantized CNN model. In the SAR ADC scheme, sampling capacitors are integrated, such that a peak operating frequency at 1.2 V is 355 MHz. Compared with the SOTA design, a CIM-based P2ARAM macro module achieves a calculation density of 59.1 TOPS/mm$^2$, higher than the calculation density in a current best design by 30 times, and the highest energy efficiency of 305.4 TOPS/W.

The 64×64 CIM-based P2ARAM accelerator provided in the present disclosure is manufactured by using the 55 nm CMOS process, and the peak classification accuracy of the accelerator is 90.68% for the CIFAR-10 dataset and 66.92% for the CIFAR-100 dataset.

What is claimed is:

1. An enhanced dynamic random access memory (eDRAM)-based computing-in-memory (CIM) convolutional neural network (CNN) accelerator, comprising four P2ARAM blocks, wherein each of the P2ARAM blocks comprises a 5T1C ping-pong eDRAM bit cell array composed of 64×16 5T1C ping-pong eDRAM bit cells, each of the 64×16 5T1C ping-pong eDRAM bit cells adopts a 5T1C circuit structure and has two 2T read ports, the 2T two read ports are respectively connected to an accumulation bit line (ABL) 1 and an ABL 2, and the 2T two read ports correspond to two activation value input terminals respectively;

the two 2T read ports of the 5T1C ping-pong eDRAM bit cell array support bit cell-based parallel in-memory convolution operations, and the two 2T read ports complete a convolution and a bit line (BL) resetting in parallel in a cycle; and the two 2T read ports operate in a ping-pong mode, wherein one of the 2T read ports performing the BL resetting completes a convolution in a next cycle, the other of the 2T read ports performing the convolution completes a BL resetting in the next cycle, and the 2T read port performing the convolution hides a pre-discharge overhead of a BL;

an eDRAM cell storage node of each of the 5T1C ping-pong eDRAM bit cells is configured to store an analog weight value and a voltage value with a reverse turn-off noise generated by a noise compensation circuit; and when a write transistor of each eDRAM cell storage node is turned off, a forward turn-off noise and the reverse turn-off noise stored in the eDRAM cell storage node are mutually offset, thereby reducing an impact of the noise on an analog weight value stored in the eDRAM cell storage node;

in each of the P2ARAM blocks, 64×2 digital time converters convert a 4-bit activation value into different pulse widths from a row direction and input the pulse widths into the 5T1C ping-pong eDRAM bit cell array for a calculation; a total of 16×2 convolution results are output in a column direction of the 5T1C ping-pong eDRAM bit cell array; and a convolution is realized by charging an input sampling capacitor of a successive approximation register analog-digital converter (SAR ADC) unit by a plurality of 5T1C ping-pong eDRAM bit cells on the ABL at the same time, and a voltage value of the input sampling capacitor is read by the SAR ADC unit;

an input sampling capacitor on an ABL is combined into a SAR ADC unit connected to the ABL, and an area of the input sampling capacitor on the ABL is allotted to a C-DAC capacitor of the SAR ADC unit; every two of 16 columns of 64×16 5T1C ping-pong eDRAM bit cells in the 5T1C ping-pong eDRAM bit cell array form a group; in one group, one column of 64×16 5T1C ping-pong eDRAM bit cells is a sign bit column, and the other column of 64×16 5T1C ping-pong eDRAM bit cells is a numerical bit column; then an ABL 1 and an ABL 2 of the sign bit column each are connected to three SAR ADC units to form an RS ADC unit; an ABL 1 and an ABL 2 of the numerical bit column each are connected to three SAR ADC units to form an RM ADC unit; and 12 related SAR ADC units corresponding to a group of 5T1C ping-pong eDRAM bit unit columns are segmented and crossed, wherein the three RS ADC units connected to the ABL 1 of the sign bit column cross with the three RM ADC units connected to the ABL 1 of the numerical bit column, the three RS ADC units connected to the ABL 2 of the sign bit column cross with the three RM ADC units connected to the ABL 2 of the numerical bit column, and two crossed SAR ADC units are configured to support calculation of a non-2's complement and a 2's complement;

when the 2's complement is calculated, every pair of two crossed RM ADC units and RS ADC units are combined into one ADC for a conversion, where in this case, the sign bit column is used to store a 1-bit sign value, and the numerical bit column is used to store a value of other bits such as five bits; an input sampling capacitor of the RS ADC unit obtains a result of sign bit multiplication, and an input sampling capacitor of the RM ADC unit obtains a result of numerical bit multiplication; and the input sampling capacitor of the RS ADC unit and the input sampling capacitor of the RM ADC unit directly read a 6-bit 2" 's complement by using the RS ADC unit;

when the non-2's complement is calculated, the RM ADC unit and the RS ADC unit perform conversion independently, wherein in this case, the sign bit column and the numerical bit column are calculated independently, and both the sign bit column and the numerical bit column store a 5-bit non-2's complement; and the RM ADC unit and the RS ADC unit simultaneously read the 5-bit non-2's complement for their respective input sampling capacitors; and operation control logic and skipping control logic of the SAR ADC unit are tightly coupled in a bit-serial mode to support a cross-layer calculation and an early termination of a convolution layer, an activation function layer, and a maximum pooling layer at the same time.

2. The eDRAM-based CIM CNN accelerator according to claim 1, wherein the 5T1C ping-pong eDRAM bit cell uses a negative channel metal oxide semiconductor (NMOS) transistor as the write transistor, and uses a positive channel metal oxide semiconductor (PMOS) transistor to provide the two 2T read ports.

3. The eDRAM-based CIM CNN accelerator according to claim 1, wherein the noise compensation circuit comprises an operational amplifier and a write noise compensation cell (WNCC); a target current is permutated, combined, and stacked to obtain a unit current that is 0 to 32 times the target current; after a magnification of the target current is set, the operational amplifier calculates an analog voltage required by the eDRAM cell storage node; the analog voltage is written into 20 WNCCs by using write transistors of the WNCCs, and then a write transistor of each WNCC is turned off, and a read transistor of each WNCC is turned on; and in this case, the reverse turn-off noise is obtained for the analog voltage stored in the 20 WNCCs, and the analog voltage with the reverse turn-off noise drives each write bit line (WBL) by using a rear-stage voltage follower to write to each eDRAM cell storage node of the 5T1C ping-pong eDRAM bit cell array by row.

4. The eDRAM-based CIM CNN accelerator according to claim 1, wherein the 5T1C ping-pong eDRAM bit cell supports an intra-image parallel convolution mode and an inter-image parallel convolution mode;

in the intra-image parallel convolution mode, the 5T1C ping-pong eDRAM bit cell segments and convolves a same picture, an ABL 1 corresponding to one activation value input terminal obtains a convolution operation result of a pixel or an activation value of an upper half of the picture, and an ABL 2 corresponding to another activation value input terminal obtains a convolution operation result of a pixel or an activation value of a lower half of the picture; and in the inter-image parallel convolution mode, an ABL 1 corresponding to one activation value input terminal obtains a convolution operation result of a first picture, and an ABL 2 corresponding to another activation value input terminal obtains a convolution operation result of a second picture.

5. The eDRAM-based CIM CNN accelerator according to claim 1, wherein a difference between working phases of three SAR ADC units connected to a same ABL is exactly two cycles, such that a convolution result on the corresponding ABL is sampled circularly.

* * * * *